United States Patent Office

Re. 24,090
Reissued Nov. 15, 1955

24,090

IMPREGNATED SALT TABLET

Horace W. Diamond, Chicago, Ill., assignor to Morton Salt Company, Chicago, Ill., a corporation of Illinois No Drawing. Original No. 2,665,236, dated January 5, 1954, Serial No. 198,037, November 28, 1950. Application for reissue November 3, 1954, Serial No. 466,706

3 Claims. (Cl. 167—82)

Matter enclosed in heavy brackets [ ] appears in the original patent but forms no part of this reissue specification; matter printed in italics indicates the additions made by reissue.

My invention is concerned with a new and improved medicinal non-friable tablet of dense sodium chloride impregnated with a skeletonal membranous structure to delay its rate of absorption by the human gastro-intestinal tract. In particular my invention relates to salt in tablet form, the granular particles of which are coated with membranous films of an edible, normally solid waxy material to bring about a desired retarding of the tablet's dissolution time and the method for preparing the same.

It is now a familiar practice for humans to consume salt, especially in tablet form, to avert the ill effects of excessive heat and perspiring. This practice is most general among industrial workers, especially those in the steel or like industries, and was endorsed with approval as a general beneficial practice for members of our Armed Forces during World War II. Experience has proven, however, that salt tablets formed without a deterring agent of some type dissolve so rapidly within the human stomach as to lead to violent nausea, apigastric discomfort and vomiting, causing greater distress than the heat effects which they are designed to combat. Various suggestions have been made for combating these ill effects, but the most promising solution to date appears to lie in attempting to retard the rate of absorption or dissolution of the salt tablets whereby the human gastro-intestinal tract has an opportunity to acclimate itself to the introduction of the salt.

Accordingly, I have discovered that the impregnation of a salt tablet with refined edible, normally solid waxy material for example, paraffin, beeswax, stearic acid and the like greatly increases the dissolution time thereof to the end that the expected ill effects of the salt, when introduced to the human gastro-intestinal tract are largely avoided.

It is the main object of my invention to disclose a treatment for retarding the dissolution time and thus the rate of absorption of salt tablets introduced to the human gastro-intestinal tract thereby preventing nausea and irritation of the stomach and related parts of the digestive system.

It is another object of my invention to demonstrate a new and improved sodium chloride tablet, impregnated with paraffin or a like edible waxy material, that is adapted for human consumption for the purpose of avoiding the ill effects of heat exhaustion or the like.

The above objects and further desirable features of my tablet will be recognized by one skilled in the art from the following detailed description and specifications.

In order to accomplish the desired features set forth above, I prefer to form dense non-friable sodium chloride or salt tablets by a known punching method in a suitable tableting machine under formation pressures ranging from 5 tons per square inch to 10 tons per square inch. The salt may vary in its refined quality, but I have found a salt having the following screen analysis to be satisfactory in practice.

SALT SCREEN ANALYSIS

| Screen size | Percent Salt Remaining on Screen |
|---|---|
| U. S. Standard 28 mesh | 0.4 |
| U. S. Standard 35 mesh | 17.8 |
| U. S. Standard 48 mesh | 51.8 |
| U. S. Standard 65 mesh | 23.8 |
| U. S. Standard 100 mesh | 5.5 |
| Through 100 mesh | 0.7 |
| Total | 100.0 |

*Salt screen analysis*

| *Screen Size* | *Percent Salt Remaining On Screen* |
|---|---|
| *U. S. Tyler 28 mesh* | *0.4* |
| *U. S. Tyler 35 mesh* | *17.8* |
| *U. S. Tyler 48 mesh* | *51.8* |
| *U. S. Tyler 65 mesh* | *23.8* |
| *U. S. Tyler 100 mesh* | *5.5* |
| *Through 100 mesh* | *0.7* |
| *Total* | *100.0* |

In carrying out my invention I further prefer the tablets made from the above grade of salt and punched out under the above formation pressures in a conventional tabletive machine, to be of a size commercially used in present dispensing machines (i. e. diameter $\frac{13}{32}$ inch, thickness 0.20 inch, weight 10±0.5 grains). I introduce tablets of this character to a dipping bath of molten, edible, normally solid waxy material, such as refined paraffin, beeswax, stearic acid or other materials of a like nature. By way of illustration, I shall hereinafter describe a preferred manner of forming my tablet, which is completely satisfactory and wherein the dipping bath to which the tablets are introduced consists of refined, molten paraffin of food grade purity having a melting point ranging from 122° to 124° F., although other paraffins having different melting ranges are available which are equally satisfactory for this purpose. The dipping time in this bath may vary from 10 to 60 seconds with an average time of 20 seconds being preferred; an increase in dipping time over 20 seconds appearing to have little effect on the paraffin's penetration and dissolution time of my tablet. The effects of the paraffin penetration are variable according to whether the tablet is punched "hard" or "soft." Formation pressures in the neighborhood of 5 tons/sq. in. produce a "soft" tablet while pressures of 10 tons/sq. in. produce a "hard" tablet. In general the harder the tablet the less paraffin impregnates the tablet and the less paraffin impregnation the shorter the disintegration time. Additional variation of the paraffin pentration and impregnation may be obtained by varying the heat of the tablet at the time of dipping. In general, contrary to what one might expect, it may be stated that the lower the tablet temperature, within reasonable limits, the greater the degree of penetration. In this connection the results of my experiments show that 10 grain tablets preheated so as to have a dipping temperature upon introduction to the dipping bath of approximately 100° F. have slightly less paraffin penetration and thus a short disintegration time than like tablets which are of room temperature when dipped.

By way of illustrating the above dipping principles, and results, the following comparative table of paraffin skeleton weights may be taken as typical of the relative effects of hardness and dipping temperatures on the impregnation with paraffin of a 10 grain tablet of the character specified herein. In this table "hot" refers to tablet dipping temperatures of approximately 100° F. while "cold" refers to normal room temperature. Dipping time is the same for all tablets listed.

| Tablet Condition | Milligrams of Paraffin/10-grain Tablet |
|---|---|
| Punched Hard—Dipped Cold | 11.5 |
| Punched Soft—Dipped Cold | 27.1 |
| Punched Hard—Dipped Hot | 8.9 |
| Punched Soft—Dipped Hot | 24.2 |

After dipping the tablets in paraffin, as specified above, the tablets are removed from the dipping bath and dried according to conventional practice.

The treatment of the salt tablet in this manner has a marked effect on its dissolution or disintegration time in water, tending to lengthen this test time over that of an untreated salt tablet. This effect is largely due to a skeletonal impregnating penetration of the tablet by the molten paraffin whereby an internal honeycomb structure is formed; the separated cells of which encase small individual pockets of salt. [In the presence of stomach liquids or other digestive juices of the human digestive system it appears that the paraffin coated or cellularly separated pockets of salt slowly take on liquid and dissolve within their individual cells; the salt liquid thus gained then osmotically leaks out of these cells into the digestive and gastro-intestinal system in liquid form at a much slower rate than if the surrounding paraffin structure is absent. The paraffin skeleton then passes harmlessly out of the body by the normal elimination processes.]

*In the presence of stomach liquids or other digestive juices it appears that the resulting internal structure restricts access of the gastro-intestinal juices to the sodium chloride tablet. This reduces the dissolution of the sodium chloride tablet to a rate substantially less than the rate of dissolution where all surfaces of the sodium chloride tablet are openly or directly exposed to the stomach liquids or gastro-intestinal fluid. In fact, tests show that the rate of dissolution of the sodium chloride tablet obtainable with the present invention is substantially less than that obtainable with a dialyzing film of cellulose acetate or cellulose nitrate. After dissolution of the sodium chloride, the residual internal structure passes harmlessly out of the body by the normal elimination processes.*

In determining the total disintegration time of the tablet I have adapted the standard specified by our Federal Government wherein a salt tablet is suspended in a 10 mesh screen at the 80 milliliter mark of a 100 milliliter graduate cylinder in 100 milliliters of distilled water at 70° F. The time is then noted until the supporting skeletonal structure rises to the surface. This time represents the total disintegration time of the tablet. By this test, a plain unimpregnated salt tablet will disintegrate in approximately nine minutes. Tablets punched "hard" and dipped in molten paraffin for 20 seconds under my above described treatment have an average total distintegrating time of approximately 13 minutes while similar "soft" punched tablets dipped for 20 seconds have an average total disintegration time of approximately 73 minutes. In the above disintegration test figures both the "hard" and "soft" tablet temperature, upon introduction to the paraffin dip, was that of the surrounding room.

Thus it is observed that my impregnated salt tablet is far superior in disintegration characteristics to that of a plain untreated salt tablet and that by my invention a new and improved medicinal salt tablet is provided, completely satisfactory to the user for dispelling the ill effects of heat exhaustion or the like without causing undue nausea or irritation of the gastric mocusa of the human digestive system.

While I have herein described a particular preferred embodiment of my invention, it will be recognized that numerous changes, modifications and substitutions of equivalent ingredients may be made therein without departing from the spirit and scope of my invention. Therefore, I do not wish to be limited to the specific illustrations and embodiments herein described other than may appear in the following appended [claim] *claims.*

I claim:

*1.* As a new article of manufacture, a non-friable, internally reinforced tablet comprising substantially 10 grains of refined granular sodium chloride tableted under formation pressures of from 5–10 tons per square inch, and an internally disposed cellular structure comprising substantially 8–28 milligrams of refined paraffin, impregnated between and around the grains of the tableted sodium chloride while in a molten state [said internal cellular structure permitting the osmotic dissolution of said sodium chloride therethrough in the presence of human gastro-intestinal juices at a rate substantially less than the normal rate of dissolution of sodium chloride in such juices.], *said internal cellular paraffin structure permitting the disillusion of said sodium chloride therethrough in the presence of human gastro-intestinal juices at a rate substantially less than the normal rate of disillusion of sodium chloride in said juices.*

*2. As a new article of manufacture, a tablet comprising sodium chloride tableted under formation pressure, and an internally disposed generally cellular structure comprising an edible, normally solid waxy material impregnated between and around the grains of the sodium chloride tablet while in a molten state and subsequently solidified, the formation pressure and amount of waxy substance for the tablet being related substantially as formation pressures of from 5–10 tons per square inch and substantially 8–28 milligrams of waxy substance are related for a tablet comprising substantially 10 grains of sodium chloride.*

*3. As a new article of manufacture, a non-friable, internally reinforced tablet comprising grains of refined granular sodium chloride tableted under formation pressure into non-friable tablet form, and an internally disposed cellular structure comprising refined paraffin impregnated between and around the grains of the tableted sodium chloride while in a molten state, the formation pressure and amount of waxy substance for the tablet being related substantially as formation pressures of from 5–10 tons per square inch and substantially 8–28 milligrams of waxy substance are related for a tablet comprising substantially 10 grains of sodium chloride, said internal cellular paraffin structure permitting dissolution of said sodium chloride in the stomach at a rate substantially less than the normal rate of dissolution of sodium chloride in the stomach.*

References Cited in the file of this patent or the original patent

UNITED STATES PATENTS

| | | |
|---|---|---|
| 1,498,666 | Mason | June 24, 1924 |
| 2,011,587 | Miller | Aug. 20, 1935 |
| 2,373,763 | Kuever | Apr. 17, 1945 |
| 2,478,182 | Consolazio | Aug. 9, 1949 |
| 2,540,979 | Clymer | Feb. 6, 1951 |

OTHER REFERENCES

Jour. Amer. Pharm. Assn., Pharm. Abs., April 1944, page 105.

Jour. Amer. Pharm. Assn., Sci. Ed., May 1945, pp. 135–142 (pp. 135 and 136 pertinent).